(12) United States Patent
Matsumoto

(10) Patent No.: US 11,856,567 B2
(45) Date of Patent: *Dec. 26, 2023

(54) COMMUNICATION SYSTEM

(71) Applicant: DENSO CORPORATION, Kariya (JP)

(72) Inventor: Sho Matsumoto, Kariya (JP)

(73) Assignee: DENSO CORPORATION, Kariya (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/166,059

(22) Filed: Feb. 8, 2023

(65) Prior Publication Data

US 2023/0189236 A1 Jun. 15, 2023

Related U.S. Application Data

(63) Continuation of application No. 17/078,177, filed on Oct. 23, 2020, now Pat. No. 11,606,790.

(30) Foreign Application Priority Data

Oct. 29, 2019 (JP) ................................ 2019-196357

(51) Int. Cl.
*H04W 4/08* (2009.01)
*H04W 72/0453* (2023.01)

(52) U.S. Cl.
CPC ......... *H04W 72/0453* (2013.01); *H04W 4/08* (2013.01)

(58) Field of Classification Search
CPC ............... H04W 72/0453; H04W 4/08; H04W 52/0219; H04L 5/0044; H04L 5/0007; Y02D 30/70

See application file for complete search history.

(56) References Cited

U.S. PATENT DOCUMENTS

| | | | |
|---|---|---|---|
| 11,606,790 B2* | 3/2023 | Matsumoto | H04W 4/08 |
| 2006/0039318 A1* | 2/2006 | Oh | H04L 5/0037 370/328 |
| 2009/0279508 A1* | 11/2009 | Tod | H04L 27/0012 370/335 |
| 2010/0302980 A1* | 12/2010 | Ji | H04W 52/0216 370/311 |
| 2011/0194513 A1* | 8/2011 | Kim | H04W 52/244 370/329 |

(Continued)

FOREIGN PATENT DOCUMENTS

| | | |
|---|---|---|
| JP | 2010-183215 A | 8/2010 |
| JP | 2012-256982 A | 12/2012 |

(Continued)

*Primary Examiner* — Christine Ng
(74) *Attorney, Agent, or Firm* — POSZ LAW GROUP, PLC

(57) ABSTRACT

A communication system includes plural management control units each managing a state of a battery; and plural terminal devices each acquiring battery information about at least one battery and communicating the acquired battery information with at least one of the plural management control units. At least one of the plural management control units includes an abnormality determination unit that is configured to determine whether an abnormality has occurred in an other management control unit based on communication with the other management control unit via an inter-management communication device for performing communication with the other management control unit.

14 Claims, 8 Drawing Sheets

(56) References Cited

U.S. PATENT DOCUMENTS

| | | | | |
|---|---|---|---|---|
| 2012/0051322 | A1* | 3/2012 | Huang | H04L 65/80 370/331 |
| 2012/0071183 | A1* | 3/2012 | Saitou | H04W 24/04 455/507 |
| 2012/0196607 | A1* | 8/2012 | Samardzija | H04J 11/0053 455/450 |
| 2014/0226512 | A1* | 8/2014 | Kosugi | H04W 24/00 370/252 |
| 2015/0239365 | A1* | 8/2015 | Hyde | B60L 58/26 701/2 |
| 2019/0215750 | A1* | 7/2019 | Xu | H04W 68/005 |
| 2020/0145175 | A1* | 5/2020 | Hassan Hussein | H04W 72/541 |

FOREIGN PATENT DOCUMENTS

| | | |
|---|---|---|
| JP | 2016-012954 A | 1/2016 |
| JP | 2018-014672 A | 1/2018 |

\* cited by examiner

COMMUNICATION SYSTEM

CROSS REFERENCE TO RELATED APPLICATIONS

The present application is a continuation application of U.S. Utility Application No. 17/078,177 filed on Oct. 23, 2020, which claims the benefit of priority of Japanese Patent Application No. 2019-196357, filed on Oct. 29, 2019, the disclosures of which are incorporated herein by reference.

TECHNICAL FIELD

The present disclosure relates to a communication system including at least one terminal device that acquires information about a battery and at least one management device that communicates with the terminal device.

BACKGROUND INFORMATION

In one embodiment, a battery system including an intermediate management device and a terminal management device provided in each battery.

The terminal management device acquires information about the battery.

The intermediate management device and the terminal management device perform wireless communication using one specific frequency band. However, as a result of a detailed study by the inventor, a problem is found in a communication system including plural intermediate management devices and plural terminal management devices that it is difficult improve communication efficiency in such system since one specific frequency band is used therein, making it necessary to perform communication in a time division manner.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Figure 1:
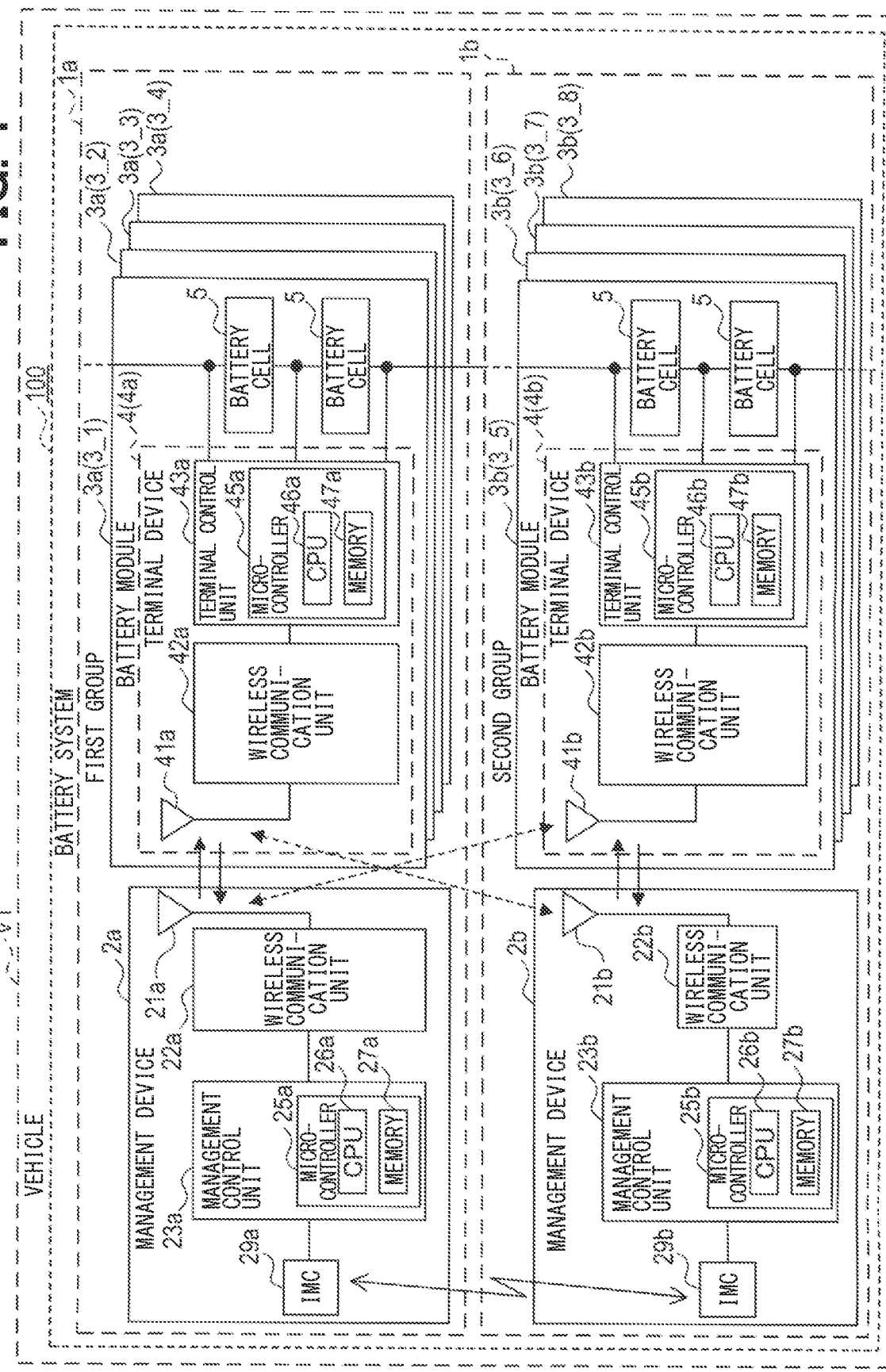
FIG. 1 is a block diagram of a configuration of a communication system.

Hereinafter, exemplary embodiments of the present disclosure are described with reference to the drawings.

[1. First Embodiment]
[1. Configuration]
<Overall Configuration>

The configuration of a battery system 100 according to the present embodiment is described with reference to FIGS. 1 and 2. A battery system 100 is mounted on a vehicle V1. The battery system 100 includes plural management devices 2 and plural battery modules 3. The battery system 100 may also be called a communication system 100.

The battery modules 3 are similarly configured. One battery module 3 includes one terminal device 4 and at least one battery cell 5. That is, the battery system 100 includes plural management devices 2 and plural terminal devices 4. The management device 2 performs wireless communication with the terminal device 4. The terminal device 4 acquires battery information from the battery cell 5, and performs wireless communication with the management device 2. The battery information means information about a state of the battery cell 5. For example, a voltage of the battery cell 5 corresponds to the battery information. For example, battery module 3a(3_1) includes management device 2a and terminal device 4(4a).

In the present embodiment, the plural management devices 2 and the plural terminal devices 4 included in the battery system 100 form plural groups each including one management device 2 and at least one terminal device 4. The plural groups include a first group 1a and a second group 1b. In the following, individual constituent elements related to the first group 1a is denoted by reference numerals such as a management device 2a with subscript "a," and individual constituent elements related to the second group 1b is denoted by reference numerals such as a management device 2b with subscript "b." In addition, when describing common elements, a suffix is abbreviated/omitted and only a numeral is shown like the management device 2, for example.

Figure 2:
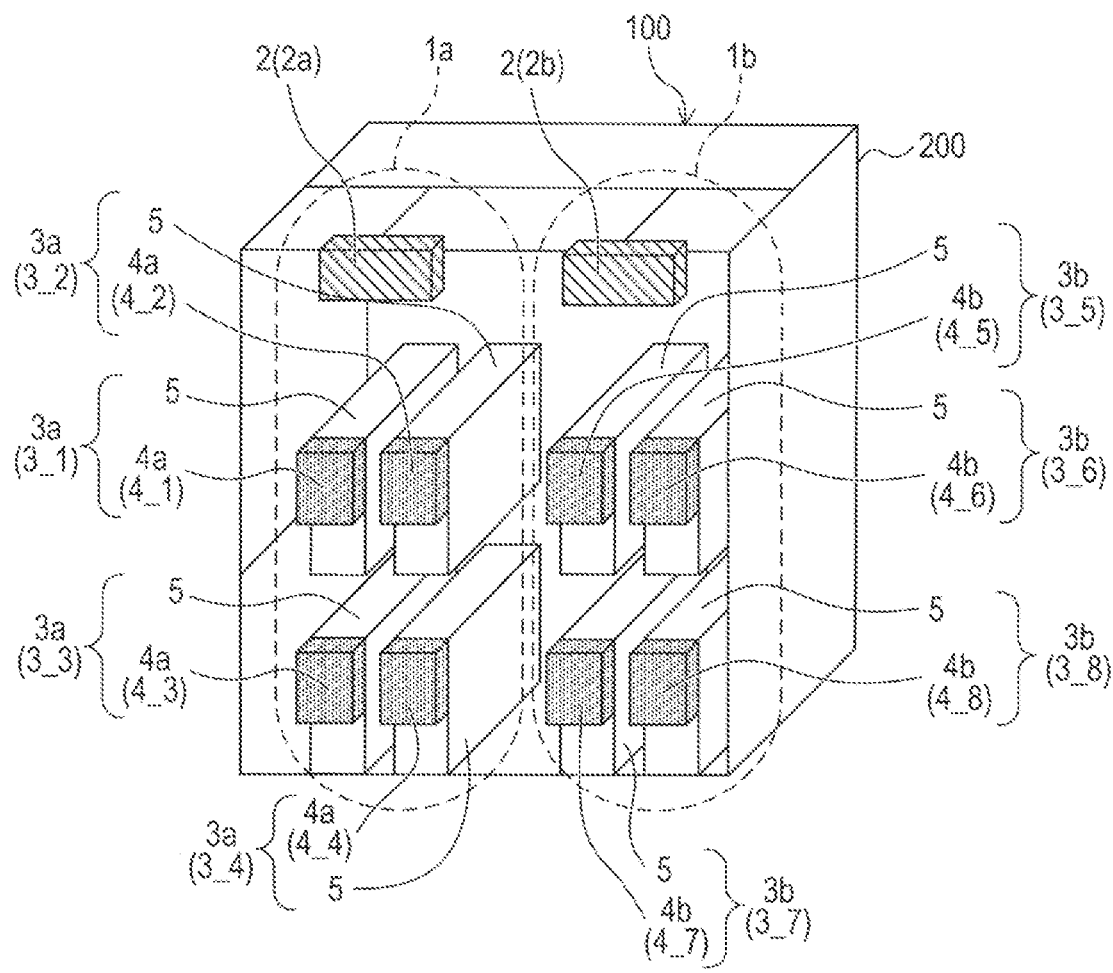
FIG. 2 is a schematic diagram of the configuration of the communication system.

As shown in FIG. 2, the plural management devices 2 and the plural battery modules 3 included in the battery system 100 are arranged in a housing 200 installed in the vehicle V1. In the present embodiment, the housing 200 is made of metal. For example, in the example shown in FIG. 2, the management device 2 and the terminal device 4 belonging to the first group 1a are arranged on the left side in FIG. 2, and the management device 2 and the terminal device 4 belonging to the second group 1b are arranged on the right side of FIG. 2. Note that the arrangement of the first group 1a and the second group 1b is not limited to the above. The management device 2 and the terminal device 4 belonging to the first group 1a, and the management device 2 and the terminal device 4 belonging to the second group 1b may be arbitrarily arranged in the housing 200. In the present embodiment, a first group of battery modules 3a includes battery modules 3_1 to 3_4, and a second group of battery modules 3b includes battery modules 3_5 to 3_8. In the following, when describing individual battery modules and constituent elements included in the respective battery modules, reference numerals may be added such as the battery module 3_1 and a terminal device 4_1. For example, the battery system 100 includes plural management devices 2 and plural terminal devices 4_1 to 4_8.

In FIGS. 1 and 2, the battery system 100 includes the management devices 2a and 2b and the terminal devices 4_1 to 4_8. The management device 2a and the terminal devices 4_1 to 4_4 form the first group 1a, and the management device 2a and the terminal devices 4_5 to 4_8 form the second group 1b.

Note that the number of management devices 2 and the number of terminal devices 4 included in the battery system 100 are not limited to the examples of FIGS. 1 and 2. Further, for example, the battery system 100 may include one or plural first groups 1a, and may include one or plural second groups 1b. The numbers of the first group 1a and the second group 1b may be different. Further, for example, the first group 1a and the second group 1b may each include a different number of battery modules 3, that is, a different number of terminal devices 4.

Further, in FIGS. 1 and 2, the battery module 3 includes the plural battery cells 5, but the battery module 3 may include only one battery cell 5. The number of battery cells 5 included in each of the plural battery modules 3 may be different for respective battery modules 3. When the battery module 3 includes plural battery cells 5, the plural battery cells 5 may be connected in series with each other as shown in FIG. 1, or may be connected in parallel (not shown), or may be connected in series and parallel.

Further, the housing 200 is not limited to the one made of metal. For example, the housing 200 may be made of resin, may be made of both metal and resin, or may be made of material other than metal and resin. Further, though the housing 200 is formed in a box shape in FIG. 2, the shape of the housing 200 is not limited to such shape. For example, the housing 200 may have a shape in which the battery system 100 can be housed inside, and may have any shape other than a box shape. Further, for example, the housing 200 may or may not have a radio wave shielding effect. For example, the housing 200 may be an outer shell of the vehicle V1 itself. The housing 200 may be not hermetically sealed.

<Management Device 2>

The description returns to FIG. 1. The management device 2 includes an antenna 21, a wireless communication unit 22 as a multi-band communication device described later, a management control unit 23, and an inter-management communication unit 29. The multi-band communication device is, as is described later in detail, a device configured to perform communication using a first frequency band and a second frequency band which are plural, different predetermined frequency bands used for communication between the management device 2 and the terminal device 4 in the battery system 100. The plural frequency bands used in the battery system 100, which is described below, refer to plural, different predetermined frequency bands used for communication between the management device 2 and the terminal device 4 in the battery system 100 described above.

<Wireless Communication Unit 22>

The wireless communication unit 22 transmits/receives wireless communication signals in plural frequency bands used in the battery system 100 to/from the terminal device 4 included in each of the plural battery modules 3 via the antenna 21. That is, the antenna 21 may be an antenna that transmits and receives wireless communication signals of plural frequency bands used in the battery system 100. The plural frequency bands used in the battery system 100 may be, for example, a high UHF band that uses, a frequency of several GHz.

Figure 3:
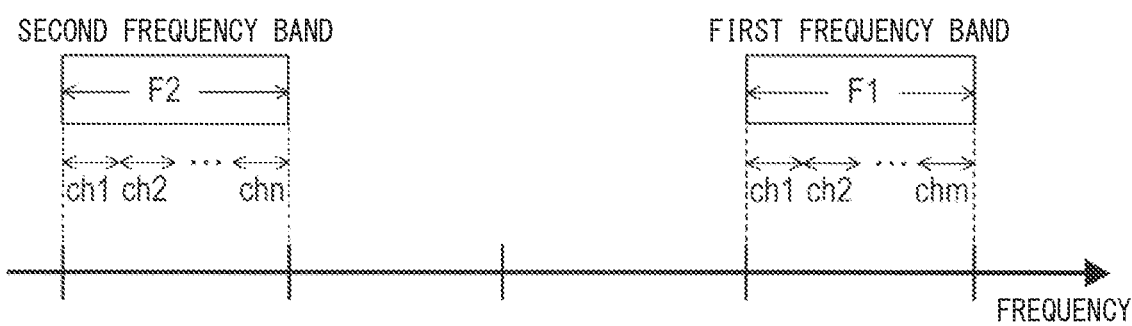
FIG. 3 is a diagram illustrating an example of plural frequency bands used in the communication system.

In the present embodiment, as shown in FIG. 3, the plural frequency bands used in the battery system 100 are two frequency bands. The two frequency bands include a first frequency band and a second frequency band that is different from the first frequency band. The first frequency band and the second frequency band do not overlap with each other. As used herein, "not overlapping" means that the range of the first frequency band and the range of the second frequency band do not overlap. In the following figures, "F1" represents the first frequency band and "F2" represents the second frequency band.

Among the first frequency band and the second frequency band, the first frequency band is assigned to the first group 1a, and the second frequency band is assigned to the second group 1b, respectively as assigned frequency bands. The assigned frequency band is one of plural frequency bands included in the battery system 100, and refers to a frequency band pre-assigned to each of plural groups in the battery system 100.

The first frequency band can be, for example, a 5 GHz band. The second frequency band is a frequency band different from the first frequency band, and may be, for example, a 2.4 GHz band. The first frequency band may be a higher frequency band than the second frequency band as shown in FIG. 3, or may also be a lower frequency band than the second frequency band (not shown).

In each frequency band, frequency channels can be provided by the number that is obtained by dividing the frequency band by a specific bandwidth. For example, in the 2.4 GHz band, the number of frequency channels (for example, 2.4 GHz-2.48 GHz) is derived by division by a specific bandwidth of 2 MHz, which is 40 channels.

The wireless communication unit 22 transmits and receives wireless communication signals according to a predetermined communication standard for each of the first frequency band and the second frequency band. Examples of the predetermined communication standard include WiFi (registered trademark), Bluetooth (registered trademark), Bluetooth Low Energy and the like. Moreover, the wireless communication unit 22 may be a device to which a standard using UWB is applied. UWB is an abbreviation for Ultra Wide Band. Moreover, the wireless communication unit 22 may be a device to which a standard of other frequency band is applied.

Figure 4:
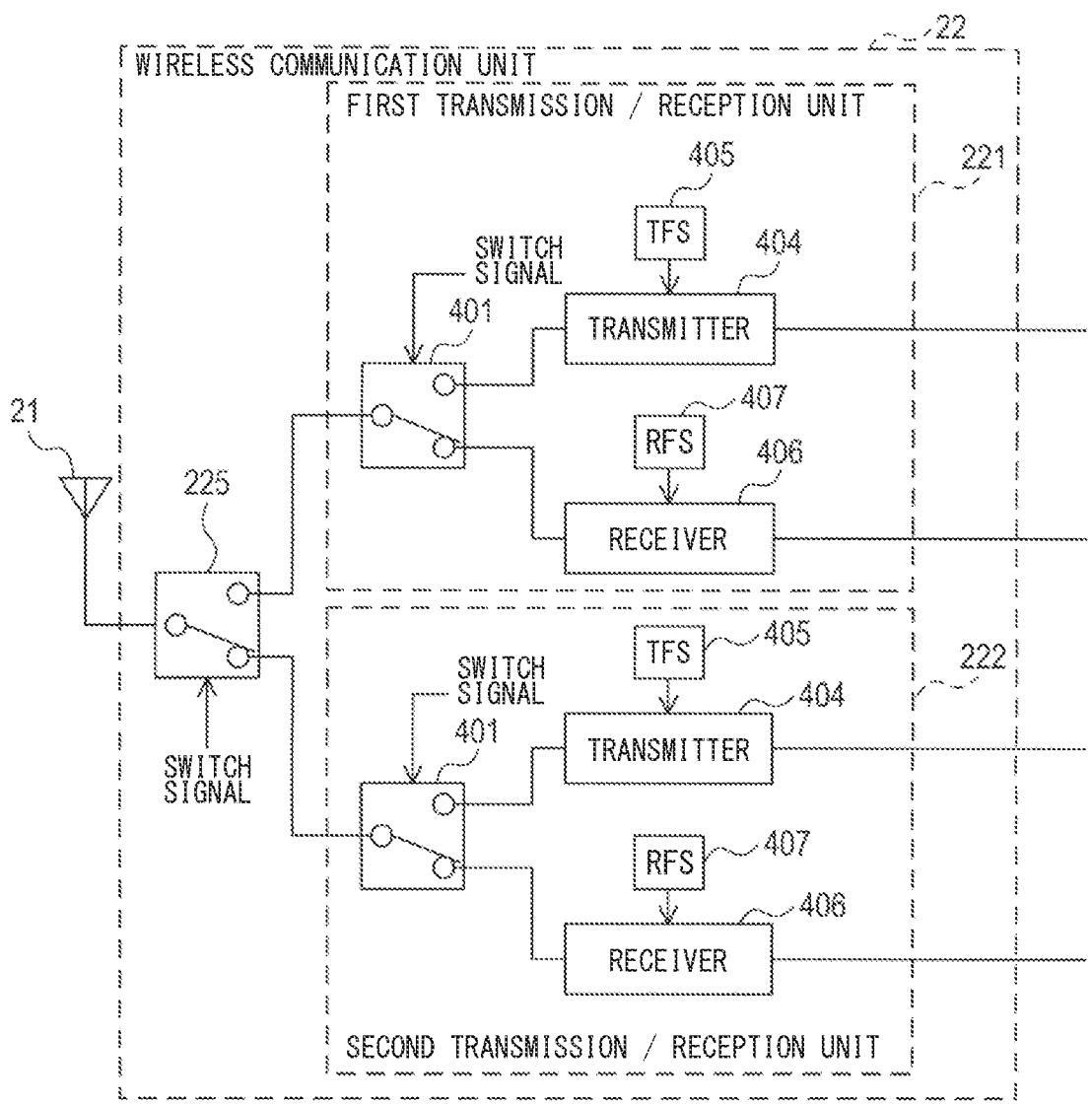
FIG. 4 is a block diagram of a configuration of a wireless communication unit included in a management device.

The wireless communication unit 22 of the present embodiment includes, for example, as shown in FIG. 4, a first transmission/reception unit 221 (also known as a first transceiver), a second transmission/reception unit 222 (also known as a second transceiver), and a switch 225. Although not shown, the wireless communication unit 22 may appropriately include various filters such as a BPF (Band Pass Filter, not shown) that passes the first frequency band and a BPF that passes the second frequency band.

The switch 225 (also known as a management main switch) has three terminals. One of the three terminals is connected to the antenna 21, one other terminal is connected to the transmission/reception switching unit 401 (also known as the first transceiver switch) included in the first transmission/reception unit 221, and one other terminal is connected to the transmission/reception switching unit 401 (also known as the second transceiver switch) included in the second transmission/reception unit 222.

The switch 225 takes one of three states, that is, (i) a state in which the transmission/reception switching unit 401 of the first transmission/reception unit 221 is selected, (ii) a state in which the transmission/reception switching unit 401 of the second transmission/reception unit 222 is selected, and (iii) a stop state. The selection is made according to the switch signal from the management control unit 23. The stop state here means a state in which neither the transmission/reception switching unit 401 of the first transmission/reception unit 221 nor the transmission/reception switching unit 401 of the second transmission/reception unit 222 is selected, or alternatively means a terminated state.

The first transmission/reception unit 221 uses the first frequency band to transmit/receive a wireless communication signal. The second transmission/reception unit 222 uses the second frequency band to transmit/receive a wireless communication signal. The first transmission/reception unit 221 and the second transmission/reception unit 222 have the same configuration other than the frequency bands used for communication. Therefore, only the first transmission/reception unit 221 is described below.

The first transmission/reception unit 221 includes a transmission/reception switching unit 401, a transmitter 404, a transmission frequency switching unit 405, a receiver 406, and a reception frequency switching unit 407. The transmission/reception switching unit 401 has three terminals. One of the three terminals is connected to the switch 225, one other terminal is connected to the transmitter 404, and one other terminal is connected to the receiver 406. The transmission/reception switching unit 401 selects one of three states such as (i) a state in which the transmitter 404 is selected, (ii) a state in which the transmission frequency switching unit 405 is selected, and (iii) a stop state according to a switch signal from the management control unit 23. The stop state here means a state in which neither the transmitter 404 nor the receiver 406 is selected, or may alternatively means a terminated state.

The transmitter 404 uses the first frequency band and transmits a wireless communication signal according to the above-described predetermined communication standard. The transmission frequency switching unit 405 sequentially switches the frequency used by the transmitter 404 for transmission in the first frequency band according to a predetermined rule (that is, according to a schedule). Hereinafter, the frequency of the wireless communication signal transmitted by the transmitter 404 is referred to as a designated frequency. Although not described here, such frequency switching may be performed by a known technique using frequency hopping, for example.

The receiver 406 uses the first frequency band and receives a wireless communication signal according to the above-described predetermined communication standard. The reception frequency switching unit 407 sequentially switches the frequencies received by the receiver 406 in the first frequency band according to the above-described predetermined rule. The switching may be performed, for example, in synchronization with the transmission frequency switching unit 405 provided in a transmission source of the communication signal (for example, the terminal device 4) so that the same frequency becomes the designated frequency at the same timing.

Although not shown, the wireless communication unit 22 may include a detection device that detects a reception intensity of the reception signal and outputs a detection result. As described above, the second transmission/reception unit 222 is configured similarly to the first transmission/reception unit 221, and a difference therebetween is that the second transmission/reception unit 222 uses the second frequency band.

<Inter-Management Communication Unit 29>

The inter-management communication unit 29 is a device that provides communication functions between the management devices. The inter-management communication device is a communication device for communication between a subject management device and other management device. The subject management device refers to a management device in, for example, one group. The other management device is a management device included in another group. The other group refers to a group to which the subject management device does not belong, among the plural groups included in the battery system 100 (that is, among the first group 1a and the second group 1b).

For example, when the management device 2a is a subject management device, the other group corresponds to the second group 1b, and the management device 2b corresponds to the other management device. Further, for example, when the management device 2b is a subject management device, the other group corresponds to the first group 1a, and the management device 2a corresponds to the other management device.

The inter-management communication unit 29 communicates with the inter-management communication unit 29 included in another management device using a wireless communication signal in a third frequency band. In the present embodiment, the third frequency band is a frequency band different from the first frequency band and from the second frequency band. However, the present disclosure is not limited to such configuration. The third frequency band may also be at least one of the first frequency band and the second frequency band. Further, as shown in a modification example described later, the inter-management communication unit 29 is not limited to wireless communication and can be realized in various manner.

<Management Control Unit 23>

Figure 5:
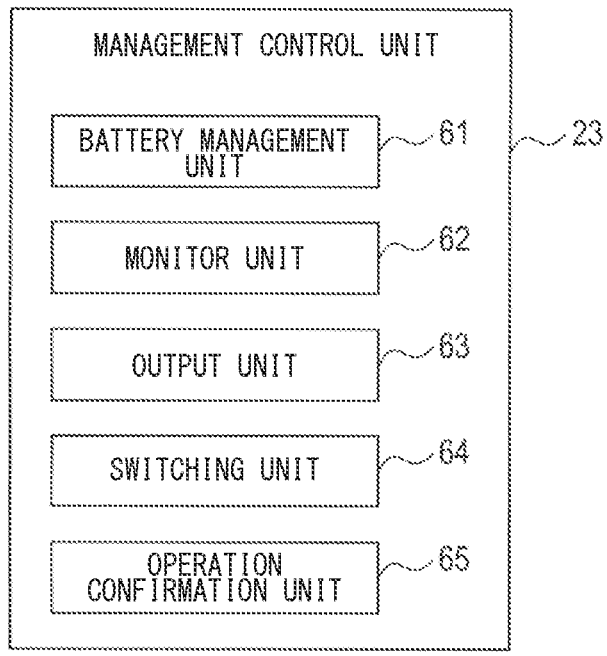
FIG. 5 is a block diagram of functions of the management device.

The management control unit 23 includes a microcontroller 25 including a CPU 26, a ROM, a RAM, and a semiconductor memory (hereinafter, memory) 27 such as a flash memory. The management control unit 23 realizes each function as shown in FIG. 5 by the CPU 26 executing a program stored in a non-transitory, tangible recording medium. The memory 27 corresponds to a non-transitory, tangible recording medium that stores a computer program. Further, by executing the computer program, a method corresponding to the computer program is performed.

As shown in FIG. 5, the management control unit 23 has the functions of a battery management unit 61, a monitor unit 62, an output unit 63, a switching unit 64, and an operation confirmation unit 65. The battery management unit 61 performs a communication with at least one terminal device 4 included in a group to which the subject management device belongs from among the plural groups included in the battery system 100, by using the wireless communication unit 22 in the assigned frequency band assigned to the group to which the subject management device belongs.

More specifically, the battery management unit 61 uses the wireless communication unit 22 to communicate with at least one terminal device 4 in the group to which the subject management device belongs, at a predetermined cycle (hereinafter, battery management cycle) using the assigned frequency band to manage the state of the battery cell 5.

For example, the management device 2a belonging to the first group 1a uses, as the assigned frequency band, the first frequency band assigned to the first group 1a to communicate with a terminal device 4a included in the first group 1a to which the subject management device 2a belongs. The management device 2b belonging to the second group 1b uses, as the assigned frequency band, the second frequency band assigned to the second group 1b to communicate with a terminal device 4b included in the second group 1b to which the subject management device 2b belongs.

The management mentioned herein means that, for example, voltage and temperature of the battery cell 5 are transmitted as battery information from the terminal device 4 in the assigned frequency band and acquired battery information is stored in the memory 27. In the present embodiment, as described above, the voltage of the battery cell 5 is acquired as the battery information. The battery management unit 61 implements these functions by performing a management process described later.

The monitor unit 62 performs a monitoring process described below, and determines whether or not an abnormality has occurred in another management device based on communication with the other management device via the inter-management communication unit 29 described above. The output unit 63 outputs the battery information stored in the memory 27 to an external device of the battery system 100. The external device may be, for example, an electronic control device (not shown) included in the vehicle V1.

The switching unit 64 outputs a switch signal to the wireless communication unit 22 in accordance with an execution instructions from the battery management unit 61 and the monitor unit 62. The switch signal is a signal for switching a communication state of the wireless communication unit 22. The execution instruction is a signal for causing the switching unit 64 to switch the communication state of the wireless communication unit 22. In the present embodiment, the switching unit 64 switches the communication state of the wireless communication unit 22 to any one of four communication states.

The four communication states include a first transmission state, a first reception state, a second transmission state, and a second reception state. The first transmission state is a state in which communication signals in the first frequency band are transmitted, and the first reception state is a state in which communication signals in the first frequency band are received. The second transmission state is a state in which communication signals in the second frequency band are transmitted, and the second reception state is a state in which communication signals in the second frequency band are received.

For example, the switching unit 64 outputs a switch signal to the wireless communication unit 22 as follows when an execution instruction for setting the wireless communication unit 22 in the first transmission state is input. That is, the switching unit 64 outputs, to the switch 225, a switch signal that connects the antenna 21 and the transmission/reception switching unit 401 included in the first transmission/reception unit 221. Further, a switch signal for connecting the switch 225 and the transmitter 404 is output to the transmission/reception switching unit 401 included in the first transmission/reception unit 221. It should be noted that the transmission/reception switching unit 401 included in the second transmission/reception unit 222 outputs a switch signal for setting the stop state. As a result, the wireless communication unit 22 enters into a state in which the communication signal in the first frequency band is transmitted.

The switching unit 64 outputs a switch signal to the wireless communication unit 22 as follows when an execution instruction for setting the wireless communication unit 22 to the first reception state is input. That is, the switching unit 64 outputs, to the switch 225, a switch signal that connects the antenna 21 and the transmission/reception switching unit 401 included in the first transmission/reception unit 221. In addition, a switch signal for connecting the switch 225 and the receiver 406 is output to the transmission/reception switching unit 401 included in the first transmitting/receiving unit 221. It should be noted that the transmission/reception switching unit 401 included in the second transmission/reception unit 222 outputs a switch signal for setting the stop state. As a result, the wireless communication unit 22 enters into a state of receiving the communication signal in the first frequency band.

When the execution instruction to put the wireless communication unit 22 in the second transmission state is input, the switching unit 64 outputs a switch signal to the wireless communication unit 22 as follows. That is, the switching unit 64 outputs to the switch 225 a switch signal for connecting the antenna 21 and the transmission/reception switching unit 401 included in the second transmission/reception unit 222. Further, a switch signal for connecting the switch 225 and the transmitter 404 is output to the transmission/reception switching unit 401 included in the second transmission/reception unit 222. It should be noted that a switch signal for putting the transmission/reception switching unit 401 included in the first transmission/reception unit 221 in the stop state is input thereto. As a result, the wireless communication unit 22 enters into a state in which the communication signal in the second frequency band is transmitted.

The switching unit 64 outputs a switch signal to the wireless communication unit 22 as follows when an execution instruction for setting the wireless communication unit 22 to the second reception state is input. That is, the switching unit 64 outputs to the switch 225 a switch signal for connecting the antenna 21 and the transmission/reception switching unit 401 included in the second transmission/reception unit 222. In addition, a switch signal for connecting the switch 225 and the receiver 406 is output to the transmission/reception switching unit 401 included in the second transmission/reception unit 222. It should be noted that a switch signal for putting the transmission/reception switching unit 401 included in the first transmission/reception unit 221 in the stop state is input thereto. As a result, the wireless communication unit 22 is in a state of receiving the communication signal in the second frequency band.

The operation confirmation unit 65 is configured to transmit an operation response signal described below when receiving an operation confirmation signal described below. Correspondence information is stored in the memory 27. The correspondence information is information in which identification information for identifying each of the plural terminal devices 4, a group to which each of the plural terminal devices 4 belongs, and an assigned frequency band of each of the plural groups are associated with each other.

<Terminal Device 4>

In FIG. 1, the battery system 100 includes plural battery modules 3, and one battery module 3 includes one terminal device 4 and plural battery cells 5. The terminal devices 4 are similarly configured. One terminal device 4 includes an antenna 41, a wireless communication unit 42, and a terminal control unit 43.

<Wireless Communication Unit 42>

The wireless communication unit 42 transmits and receives wireless communication signals to and from the management device 2 included in the battery system 100 via the antenna 41 using plural frequency bands used in the battery system 100 described above.

The wireless communication unit 42 includes a specific communication device. The specific communication device refers to a communication device configured to perform communication using the above-described assigned frequency band, which is assigned to a group to which the subject terminal device belongs among plural groups included in the battery system 100. The subject terminal device refers to a terminal device 4 itself.

For a terminal device 4a belonging to the first group 1a, an assigned frequency band of a group to which the terminal device 4a itself belongs (that is, the first group 1a) is the first frequency band. The specific communication device included in the wireless communication unit 42 of the terminal device 4a performs communication using the first frequency band. For the terminal device 4b belonging to the second group 1b, an assigned frequency band of a group to which the subject terminal device 4b itself belongs (that is, the second group 1b) is the second frequency band. The specific communication device included in the wireless communication unit 42 of the terminal device 4a performs communication using the second frequency band.

The specific communication device enables communication between the terminal device 4 and the management devices 2 belonging to the same group using the assigned frequency band assigned to such group. By the way, the wireless communication unit included in the terminal device 4 may be configured to further include a non-specific communication device. The non-specific communication device is a communication device configured to perform communication by using the assigned frequency band assigned to another group to which the subject terminal device does not belong. As described later, the wireless communication unit 42 of the present embodiment includes a non-specific communication device in addition to the specific communication device so that only the specific communication device operates and the non-specific communication device always stops operating.

Since the assigned frequency band is different for each group (i.e., different frequency to different group), the configuration of the wireless communication unit 42 may have to be different according to a group to which the subject wireless communication unit 42. However, in the present disclosure, by including the specific communication device and the non-specific communication device, the configuration of the wireless communication unit 42 is common in all groups. Note that, for the terminal device 4a, the assigned frequency band of the other group (that is, the first group 1a) is the first frequency band, and, for the terminal device 4b, the assigned frequency band of the other group (that is, the second group 1b) is the second frequency band.

More specifically, in the present embodiment, the wireless communication unit 42 includes the same elements as the wireless communication unit 22. However, in the wireless communication unit 42, unlike the wireless communication unit 22, the terminal of the switch 225 is connected to the antenna 41 instead of the antenna 21. Further, in the wireless communication unit 42, the switch 225, the transmission/reception switching unit 401 included in the first transmission/reception unit 221 and the transmission/reception switching unit 401 included in the second transmission/reception unit 222 respectively select a terminal to be connected according to a switch signal from the terminal control unit 43.

The first transmission/reception unit 221 and the antenna 41a included in the wireless communication unit 42a correspond to the specific communication device, and the second transmission/reception unit 222 and the antenna 41a included in the wireless communication unit 42a correspond to the non-specific communication device. The second transmission/reception unit 222 and the antenna 41b included in the wireless communication unit 42b correspond to the specific communication device, and the first transmission/reception unit 221 and the antenna 41b correspond to the non-specific communication device.

Here, in the wireless communication unit 42a included in the terminal device 4a belonging to the first group 1a, the switch 225 is connected to perform communication only in the first frequency band assigned to the first group 1a. For example, a switch signal for connecting the antenna 41 and the transmission/reception switching unit 401 included in the first transmission/reception unit 221 may be constantly input to the switch 225 from the terminal control unit 43a.

On the other hand, in the wireless communication unit 42b included in the terminal device 4b belonging to the second group 1b, the switch 225 is connected to perform communication only in the second frequency band assigned to the second group 1b. For example, a switch signal for connecting the antenna 41 and the transmission/reception switching unit 401 included in the second transmission/reception unit 222 may be constantly input to the switch 225 from the terminal control unit 43b.

As a result, in the terminal device 4, only the specific communication device in the wireless communication unit 42 is used for communication with the management device 2. However, the configuration of the wireless communication unit 42 is not limited to the above. The wireless communication unit 42 can be configured, for example, in a modification example described later or in various other manners.

<Terminal Control Unit 43>

The terminal control unit 43 includes a microcontroller 45 including a CPU 46 and a memory 47. The terminal control unit 43 realizes each function as shown in FIG. 5 by the CPU 46 executing a program stored in the non-transitory, tangible recording medium. The memory 47 corresponds to a non-transitory, tangible recording medium that stores a computer program. Further, by executing the computer program, a method corresponding to the computer program is performed.

Figure 6:
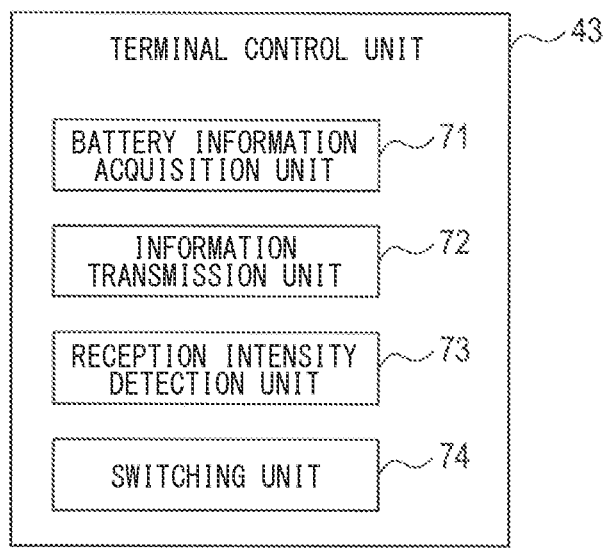
FIG. 6 is a block diagram of functions of the terminal device.

As shown in FIG. 6, the terminal control unit 43 has the functions of a battery information acquisition unit 71, an information transmitter unit 72, and a switching unit 74. The terminal control unit 43 may have the function of a reception intensity detection unit 73. The battery information acquisition unit 71 acquires the battery information from the battery cells 5 and stores it in the memory 47 at a predetermined cycle (hereinafter, information acquisition cycle). Here, the voltage values at both ends of the battery cell 5 are acquired as described above. The information acquisition cycle may be shorter than the terminal management cycle described later.

The information transmitter unit 72 uses the wireless communication unit 42 as a specific communication device (in one aspect of the wireless communication unit 42), and communicates with a management device included in a group to which the subject terminal device 4 belongs from among the plural groups included in the battery system 100 in the assigned frequency band of the group to which the subject terminal device 4 belongs.

More specifically, the information transmitter unit 72 uses the wireless communication unit 42 to perform communication in the assigned frequency band in accordance with a transmission instruction signal received from the management device 2 in a predetermined cycle (hereinafter, terminal side management cycle), for transmitting the battery information to the management device 2.

The reception intensity detection unit 73 detects a reception intensity of the wireless communication signal by the above-described detection device (not shown) every time the wireless communication unit 42 receives the wireless communication signal, and stores the information indicating the detected reception intensity in the memory 47.

The switching unit 74 is configured similarly to the switching unit 64 included in the management control unit 23. However, the switching unit 74 outputs a switch signal to the wireless communication unit 42 according to the execution instruction from the information transmitter unit 72. The switching unit 74 switches the communication state of the wireless communication unit 42.

The process performed by the terminal control unit 43 described later corresponds to a process as the information transmitter unit 72.

[2. Process]

<Process Performed by the Management Control Unit 23>

<Management Process>

Figure 7:
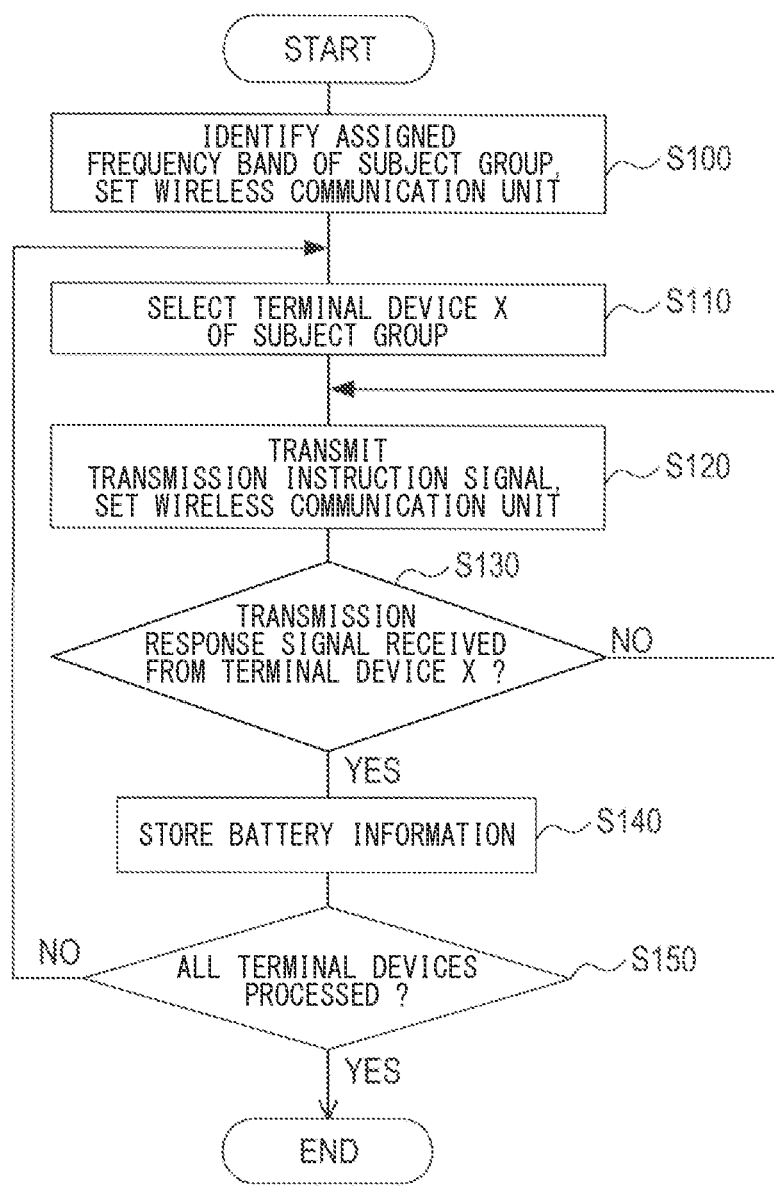
FIG. 7 is a flowchart of a management process performed by a management control unit.

FIG. 7 describes the management process performed by the battery management unit 61 of the management control unit 23. The management process is repeatedly performed in the battery management cycle described above.

In S100, the management control unit 23 identifies the assigned frequency band of a subject group, which is a group to which the subject management device belongs, and sets the wireless communication unit 22 to transmit the communication signal of the identified assigned frequency band. The assigned frequency band of the subject group is stored in the memory 27 in advance.

Here, when the first frequency band is identified as the assigned frequency band in this step, the management control unit 23 outputs an execution instruction to the switching unit 64 to put the wireless communication unit 22 in the first transmission state. On the other hand, when the second frequency band is identified as the assigned frequency band in this step, the management control unit 23 outputs an execution instruction to the switching unit 64 to put the wireless communication unit 22 in the second transmission state. As a result, the wireless communication unit 22 switches to the first transmission state or the second transmission state according to the switch signal from the switching unit 64.

In S110, the management control unit 23 selects the terminal device 4 that transmits the battery information for acquisition of the battery information from among the plural terminal devices 4 included in the subject group. Information indicating (i) which one of the terminal devices 4_1 to 4_8 included in the battery system 100 is the terminal device 4 included in the subject group, and (ii) which terminal device 4 is the terminal device 4 included in another group is stored in the memory 27 in advance. In the following, the selected terminal device 4 is described as a terminal device X4. The management control unit 23 selects the terminal device 4 to which the battery information is not transmitted, as the terminal device X4 from the plural terminal devices 4 included in the subject group.

In S120, the management control unit 23 uses the wireless communication unit 22 to transmit the transmission instruction signal in the assigned frequency band identified in S100. The transmission instruction signal is a wireless communication signal in the assigned frequency band identified in S100, and is a wireless communication signal including transmission instruction information. The transmission instruction information includes at least information indicating an instruction to transmit the battery information and identification information of the terminal device X4 that is a target for performing the instruction.

Then, the management control unit 23 sets the wireless communication unit 22 to receive the wireless communication signal in the assigned frequency band selected in S100 after transmitting the transmission instruction signal. That is, the management control unit 23 outputs to the switching unit 64 an execution instruction for setting the communication state of the wireless communication unit 22. As a result, the wireless communication unit 22 switches to the first reception state or the second reception state according to the switch signal from the switching unit 64.

In S130, the management control unit 23 determines whether or not a transmission response signal has been received from the terminal device X4. The transmission response signal is a wireless communication signal in the assigned frequency band identified in S100, and is a wireless communication signal including at least the battery information acquired by the terminal device X4. Note that the transmission response signal may include the battery information and identification information of the terminal device X4 that has acquired the battery information (that is, the terminal device X4 that is a transmission source of the transmission response signal).

Here, the management control unit 23 shifts the processing to S120 when the transmission response signal is not received from the terminal device X4, and sets the wireless communication unit 22 to transmit the wireless communication signal of the assigned frequency band selected in S100, and transmits the transmission instruction signal again. On the other hand, the management control unit 23 shifts the processing to S140 when the transmission response signal is received from the terminal device X4.

In S140, the management control unit 23 stores the battery information received from the terminal device X4 in the memory 27 in association with the identification information of the terminal device X4. In S150, the management control unit 23 determines whether or not the processes of S110 to S140 (that is, the process of transmitting the battery information and storing the transmitted battery information in the memory 27) have been performed for all the terminal devices 4.

Here, when it is determined that the above-described processes have not been performed for all the terminal devices 4, the management control unit 23 shifts the process to S110. Then, the management control unit 23 repeats the processes of S110 to S150.

On the other hand, the management control unit 23 ends the management process when it is determined that the above processes have been performed for all the terminal devices 4. At this time, the memory 27 stores the battery information about all the terminal devices 4 belonging to the subject group. In the present embodiment, the identification information and the battery information of each of the plural terminal devices 4 are associated and stored in the memory 27.

<Monitoring Process>

The monitoring process performed by the monitor unit 62 of the management control unit 23 is described with reference to a flowchart in FIG. 8. The monitoring process is repeatedly performed in a predetermined cycle in parallel with the management process described above.

In S210, the management control unit 23 uses the inter-management communication unit 29 to transmit an operation confirmation signal to another management device. The operation confirmation signal is a predetermined signal that prompts another management device receiving the operation confirmation signal to transmit an operation response signal. That is, the operation confirmation signal is a signal for confirming that the operation of another management device, which is a transmission destination of the operation confirmation signal, is normal upon normally receiving the operation response signal therefrom. In the present embodiment, the operation confirmation signal is a wireless communication signal in the third frequency band.

The operation confirmation signal may be a signal including operation confirmation information represented by a predetermined identification pattern using a binary value such as "0" and "1." In addition, the operation confirmation signal may be a signal including identification information of the terminal device X4.

In S220, the management control unit 23 determines whether or not an operation response signal is received from another management device via the inter-management communication unit 29 of another management device by the inter-management communication unit 29 of the subject management device. The operation response signal is a predetermined signal to be transmitted when the operation confirmation signal is received. In the present embodiment, the operation response signal is a wireless communication signal in the third frequency band.

Note that the operation response signal includes operation confirmation information. Further, the operation response signal may include identification information of another management device (that is, the management device 2 that is a transmission source of the operation response signal) together with the operation confirmation information. In other words, the management control unit 23 determines that at least the inter-management communication unit 29 in another management device is normal by receiving the operation response signal from another management device.

The management control unit 23 shifts the process to S240 when the operation response signal is received from another management device, and shifts the processing to S230 when the operation response signal is not received. In S230, the management control unit 23 determines whether or not a predetermined time has lapsed since the operation confirmation signal was transmitted. The management control unit 23 shifts the process to S220 when the predetermined time has not lapsed, and shifts the process to S250 when the predetermined time has lapsed.

That is, when the operation confirmation signal is received within the predetermined time, the management control unit 23 determines that at least the inter-management communication unit 29 in another management device is normal, and shifts the process to S240. On the other hand, if the operation confirmation signal is not received within the predetermined time, the management control unit 23 determines that there is an abnormality in another management device and shifts the process to S250.

In S240, the management control unit 23 determines whether the operation confirmation information included in the operation response signal is normal. The management control unit 23 determines that the operation confirmation information included in the operation response signal is normal when the information in the received response signal matches the operation confirmation information included in the operation confirmation signal transmitted in S210. In other words, when the operation confirmation information included in the operation response signal is normal, the management control unit 23 determines that, in addition to the inter-management communication unit 29 in another management device, the management control unit 23 in another management device is normal. That is, the management control unit 23 determines that another management device is normal.

Here, the management control unit 23 ends the present process when it is determined that the operation confirmation information included in the operation response signal is normal. On the other hand, when it is determined that the operation confirmation information included in the operation response signal is not normal, the management control unit 23 determines that another management device is abnormal and shifts the process to S250.

In S250 to S290, the management control unit 23 uses the wireless communication unit 22 to communicate with at least one terminal device 4 included in another group when it is determined that an abnormality has occurred in another management device. Then, the management control unit 23 causes the terminal devices 4 of another group to transmit the battery information acquired by those terminal devices 4.

That is, the management control unit 23 outputs a switch instruction to the wireless communication unit 22 when it is determined in S250 that an abnormality has occurred in another management device. The switch instruction is an instruction to switch the frequency band used in the wireless communication unit 22. Here, the management control unit 23 outputs a switch instruction, which is an instruction for performing communication using the assigned frequency band of another group among the first frequency band and the second frequency band. More specifically, the management control unit 23 outputs, to the switching unit 64, (i) an execution instruction for setting the wireless communication unit 22 in the second transmission state or (ii) an execution instruction for setting the wireless communication unit 22 in the first transmission state. As a result, the wireless communication unit 22 switches to the second transmission state or the first transmission state according to the switch signal from the switching unit 64.

Then, the management control unit 23 selects one terminal device 4 from which the battery information is transmitted from among the plural terminal devices 4 included in another group. In the following, the selected terminal device 4 is described as a terminal device X4. The management control unit 23 selects, as the terminal device X4, the terminal device 4 from which the battery information is not transmitted to the management device 2 from among the plural terminal devices 4 included in another group.

In S260, the management control unit 23 uses the wireless communication unit 22 to transmit a transmission instruction signal in the assigned frequency band of another group. The transmission instruction information included in the transmission instruction signal includes at least (i) information indicating an instruction to transmit the battery information and (ii) identification information of the terminal device X4 of another group that is a target for performing the instruction.

Then, after transmitting the transmission instruction signal, the management control unit 23 sets the wireless communication unit 22 to receive the wireless communication signal of the assigned frequency band of another group. That is, the management control unit 23 outputs to the switching unit 64 an execution instruction for setting the communication state of the wireless communication unit 22. Accordingly, the wireless communication unit 22 switches to the second reception state or the first reception state according to the switch signal from the switching unit 64.

In S270, the management control unit 23 determines whether or not the transmission response signal has been received from the terminal device X4. The transmission response signal may include the battery information and the identification information of the terminal device X4 that has acquired the battery information (that is, the terminal device X4 of another group that is a transmission source of the transmission response signal).

Here, the management control unit 23 shifts the process to S260 when the transmission response signal is not received from the terminal device X4, and sets the wireless communication unit 22 to transmit the wireless communication signal of the assigned frequency band of another group, and transmits the transmission instruction signal again. On the other hand, the management control unit 23 shifts the process to S280 when the transmission response signal is received from the terminal device X4.

In S280, the management control unit 23 stores the battery information received from the terminal device X4 in the memory 27 in association with the identification information of the terminal device X4. In S290, the management control unit 23 determines whether the processes of S250 to S280 (that is, the process of transmitting the battery information and storing the transmitted battery information in the memory 27) are performed for all the terminal devices 4 included in another group. Here, when it is determined that the above processes have not been performed for all the terminal devices 4 included in another group, the management control unit 23 shifts the process to S250. Then, the management control unit 23 repeats the process of S250 to S290.

On the other hand, when it is determined that the above processes have been performed for all the terminal devices 4 included in another group, the management control unit 23 ends the process. At this point, the memory 27 stores the battery information about all the terminal devices 4 belonging to the subject group and the battery information about all the terminal devices 4 belonging to another group. In the present embodiment, the battery information and the identification information of the terminal device 4 that has acquired the battery information are stored in the memory 27 in association with each other.

<Process Performed by Terminal Control Unit 43>

Figure 9:
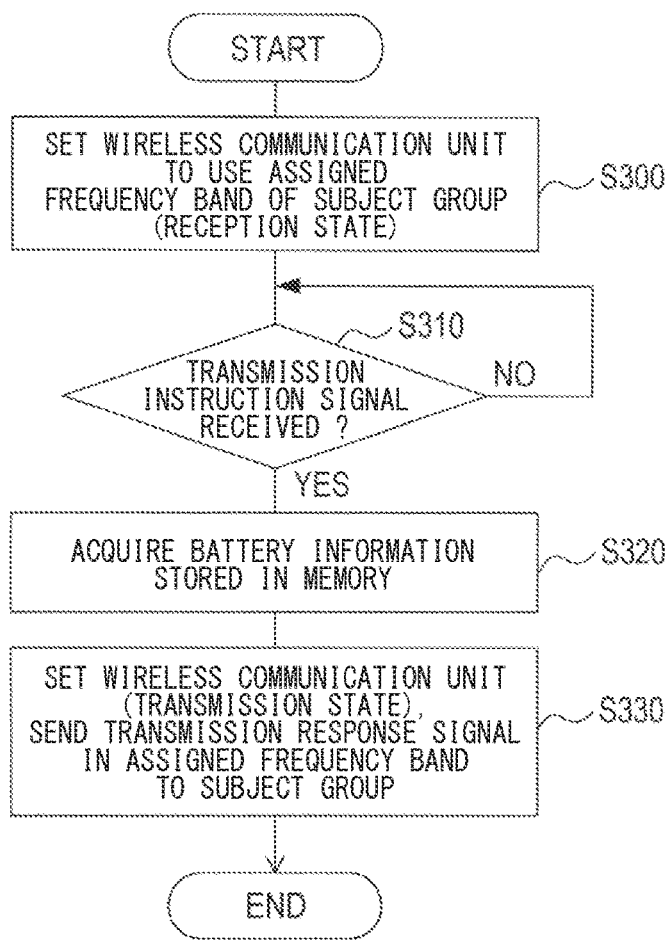
FIG. 9 is a flowchart of a process performed by a terminal control unit.

FIG. 9 describes the process performed by the terminal control unit 43. In S300, the terminal control unit 43 outputs an execution instruction to the switching unit 64 and sets the wireless communication unit 42 to receive the wireless communication signal of the assigned frequency band of the subject group.

In S310, the terminal control unit 43 determines whether or not the transmission instruction signal has been received. The terminal control unit 43 waits until the transmission instruction signal is received, and when receiving the transmission instruction signal, shifts the process to S320.

Note that, in the terminal device 4 including the terminal control unit 43, the wireless communication unit 42 is set to transmit and receive the wireless communication signal in the assigned frequency band of the subject group including the subject terminal device 4. Further, the transmission source of the transmission instruction signal here may be either a management device belonging to the subject group or a management device belonging to another group.

The terminal control unit 43 acquires the battery information stored in the memory 47 in S320. The battery information mentioned here is the battery information most recently acquired by the battery information acquisition unit 71 and is the battery information stored in the memory 47.

In S330, the terminal control unit 43 outputs an execution instruction to the switching unit 64 and sets the wireless communication unit 42 to transmit the wireless communication signal of the assigned frequency band of the subject group. Then, the terminal control unit 43 transmits the transmission response signal using the wireless communication unit 42. The transmission response signal may include the battery information and the identification information of the subject terminal device 4 that has acquired the battery information. Then, the terminal control unit 43 ends the present process.

<Operation>

The operation of the above-described battery system 100 configured is now described. In the following description, an example is specifically described, assuming that the subject management device is the management device 2$a$, the subject terminal device is the terminal device 4$a$, the other management device is the management device 2$b$, and the other terminal device belonging to another group is the terminal device 4$b$. In the following example, the subject group is the first group 1$a$ and another group is the second group 1$b$.

The management control unit 23$a$ repeatedly transmits the transmission instruction signal at a predetermined cycle (that is, the above-described battery management cycle) by wireless communication, and acquires the battery information from the terminal device 4$a$ belonging to the first group 1$a$, which is the subject group, and the acquired battery information is stored in the memory 27$a$.

Subsequently, the management control unit 23$a$ transmits an operation confirmation signal to the other management device 2$b$ belonging to the second group 1$b$, which is another group, by wireless communication to determine whether or not the other management device 2$b$ is abnormal. When it is determined that the other management device 2$b$ is abnormal, the management control unit 23$a$ transmits a transmission instruction signal by wireless communication on behalf of the other management device 2$b$, and acquires the battery information from the terminal device 4$b$ belonging to another group, and stores the battery information in the memory 27.

In the present embodiment, the management device 2$b$ also operates similarly to the management device 2$a$. That is, the management device 2$a$ and the management device 2$b$ respectively manage the battery information of the subject group and mutually confirm whether or not an abnormality has occurred (in another group). When an abnormality occurs in another management device, the battery information of the terminal device belonging to another group is managed together with the battery information of the terminal device of the subject group.

[3. Effects]

According to the first embodiment described above in detail, the following effects are achievable. (3a) Each of the management device 2$a$ included in the first group 1$a$ and the management device 2$b$ included in the second group 1$b$ is provided with the wireless communication units 22$a$ and 22$b$ respectively configured to perform communication using the first frequency band and the second frequency band, which serve as the multi-band communication devices. Each of the terminal device 4$a$ included in the first group 1$a$ and the terminal device 4$b$ included in the second group 1$b$ is provided with the wireless communication units 42$a$ and 42$b$ respectively configured to perform communication using the assigned frequency band assigned to the relevant group to which the subject terminal device belongs, serving as the specific communication devices. Among the first frequency band and the second frequency band different from the first frequency band, the first frequency band is assigned to the first group 1$a$ as an assigned frequency band, and the second frequency band is assigned to the second group 1$b$ as an assigned frequency band.

According to the above, the management device 2$a$ and the terminal device 4$a$ belonging to the first group 1$a$ can communicate with each other using the first frequency band, and the management device 2$b$ and the terminal device 4$b$ belonging to the second group 1$b$ can communicate with each other using the second frequency band. That is, in the battery system 100 arranged in the housing 200, the communication by the first group 1$a$ and the communication by the second group 1$b$ are performed using different frequency bands, and thus the two communications are performed in parallel in time. In other words, in the communication system (100), the communication by the first group (1*a*) and the communication by the second group (1*b*) need not be in time synchronization with each other, and communication processing capability (in terms of processing time) can be improved.

Figure 10:
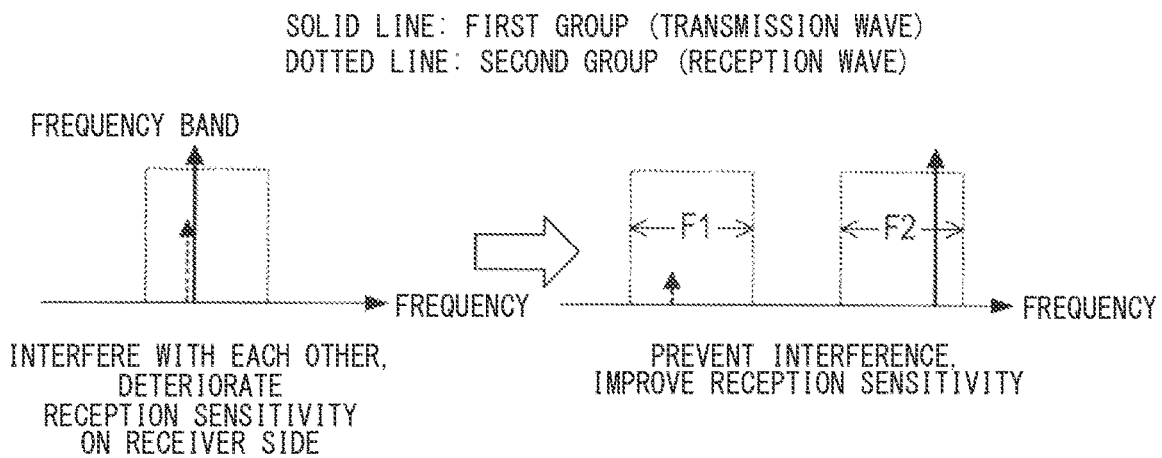
FIG. 10 is a diagram illustrating effects of the communication system.

Here, for comparison, consider a case where a communication by the first group 1*a* and a communication by the second group 1*b* are performed using the same frequency and a case where adjacent frequencies are used. For example, as shown in FIG. 10, in case of such a comparative example, one radio wave of the first group 1*a* and the other radio wave of the second group 1*b* interfere with each other, which may be a factor that deteriorates the reception sensitivity of the other wave.

On the other hand, in the battery system 100, the communication by the first group 1*a* and the communication by the second group 1*b* are performed using different frequency bands. That is, as shown in FIG. 10, the radio waves of the first group 1*a* and the second group 1*b* are prevented from interfering with each other, i.e., not causing deterioration of the reception sensitivity of the other wave. As a result, as described above, in the battery system 100, the communication by the first group 1*a* and the communication by the second group 1*b* can be performed in parallel in time (i.e., synchronously performable), and the communication processing capability in time (in terms of processing time) is improvable (3b) Each of the management device 2*a* included in the first group 1*a* and the management device 2*b* included in the second group 1*b* includes the battery management unit 61 as a regular management communication unit (in claims). The battery management unit 61 uses the wireless communication unit 22 to communicate with at least one terminal device included in the group, to which the subject management device belongs, in the assigned frequency band of the group to which the subject management device belongs.

That is, the management device 2*a* and the terminal device 4*a* communicate with each other in the first frequency band that is the assigned frequency band of the first group 1*a*, and the management device 2*b* and the terminal device 4*b* are the assigned frequency band of the second group 1*b* communicate with each other in the second frequency band. As a result, in the battery system 100, since the communication by the first group 1*a* and the communication by the second group 1*b* do not need time synchronization, it is possible to improve the communication process capability (in terms of processing time).

(3c) The first frequency band and the second frequency band do not overlap. Therefore, it is possible to prevent the communication signals used in the first group 1*a* and the communication signals used in the second group 1*b* from interfering with each other, and, in the battery system 100, the communication by the first group 1*a* can be performed asynchronously with the communication by the second group 1*b*. Asynchronous means that temporal synchronization is not required. As a result, the battery system 100 can improve communication efficiency in terms of processing time.

(3d) In the battery system 100, at least one of the management device 2*a* included in the first group 1*a* and the management device 2*b* included in the second group 1*b* includes an abnormality determination unit. In the present embodiment, both the management device 2*a* included in the first group 1*a* and the management device 2*b* included in the second group 1*b* include an abnormality determination unit. In S220 to S240, which is the process of the abnormality determination unit, the management control unit 23 determines whether an abnormality has occurred in another management device based on communication with another management device via the inter-management communication unit 29 as the inter-management communication device.

As a result, the management device 2*a* and the management device 2*b* can mutually confirm whether or not an abnormality has occurred. (3e) In the battery system 100, among the management devices 2*a* included in the first group 1*a* and the management devices 2*b* included in the second group 1*b*, the management device 2 including the above-described abnormality determination unit includes an abnormal time communication unit. In S250 to S290, which is the process of the abnormal time communication unit at the time of abnormality, when determining that an abnormality has occurred in another management device, the management control unit 23 performs communication with at least one terminal device in another group using the wireless communication unit 22.

As a result, in the battery system 100, the function of performing wireless communication between the management device 2 and the plural terminal devices 4_1 to 4_8 can have a redundant configuration. For example, when the battery system 100 is a battery system mounted on the vehicle V1 as in the present embodiment, from the viewpoint of functional safety of the system mounted on the vehicle V1, a function for performing wireless communication within the battery system 100 preferably has a redundant design (e.g., duplexing). The battery system is a system for periodically acquiring battery information indicating the state of the battery cells 5 and monitoring the state of the battery cells 5.

As a comparative example for realizing a redundant configuration, for example, a configuration in which plural groups each including one management device 2 and terminal devices 4_1 to 4_8 is simply provided is considered. However, in such configuration, the number of elements is simply increased.

On the other hand, in the present embodiment, unlike the comparative example, plural groups each including one management device 2 and terminal devices 4_1 to 4_8 are not simply provided, but plural management devices 2 and terminal devices 4_1 to 4_1 to By providing 4_8, a redundant configuration is realized only when there is an abnormality. The abnormal time means a time when an abnormality occurs in any one of the plural management devices 2. As a result, in the battery system 100, a redundant configuration can be realized while suppressing an increase in the number of elements.

(3f) The wireless communication unit 22 is configured to perform communication using one of the first frequency band and the second frequency band according to the switch instruction. Among the management devices 2*a* included in the first group 1*a* and the management devices 2*b* included in the second group 1*b*, the management device 2 including the above-described abnormality determination unit includes a switch instruction unit. In S250 and S260 which are processes as the switch instruction unit, when it is determined that an abnormality has occurred in another management device, the management control unit 23 outputs, to the wireless communication unit 22, a switch instruction for performing communication by using the assigned frequency band of another group.

As a result, when an abnormality occurs in the other management device, the management device 2*a* and the management device 2*b* can perform communication with the terminal device of group to which the other management device belongs using the wireless communication unit 22, instead of (i.e., on behalf of) the other management device.

(3g) At least one of the terminal device 4a included in the first group 1a and the terminal device 4b included in the second group 1b may include a non-specific communication device. In the present embodiment, both of the terminal device 4a and the terminal device 4b include a non-specific communication device.

As a result, the terminal device 4 belonging to the first group 1a and the terminal device 4 belonging to the second group 1b can be used in common (i.e., can have the same configuration).

[4. Modification]

A few modifications of the present disclosure are shown in the following.

<Modification 1>

In the above-described embodiment, the management device 2 includes the inter-management communication unit 29 as an inter-management communication device, and the management control unit 23 (that is, the monitor unit 62) determines whether the other management device is abnormal or not via wireless communication. However, the present disclosure is not limited to such configuration. For example, the inter-management communication unit 29 included in the management device 2 may be a communication device that performs wired communication. The management control unit 23 (that is, the monitor unit 62) may also be configured to determine whether the other management device is abnormal via wired communication using the inter-management communication unit 29 at a predetermined cycle.

Figure 11:
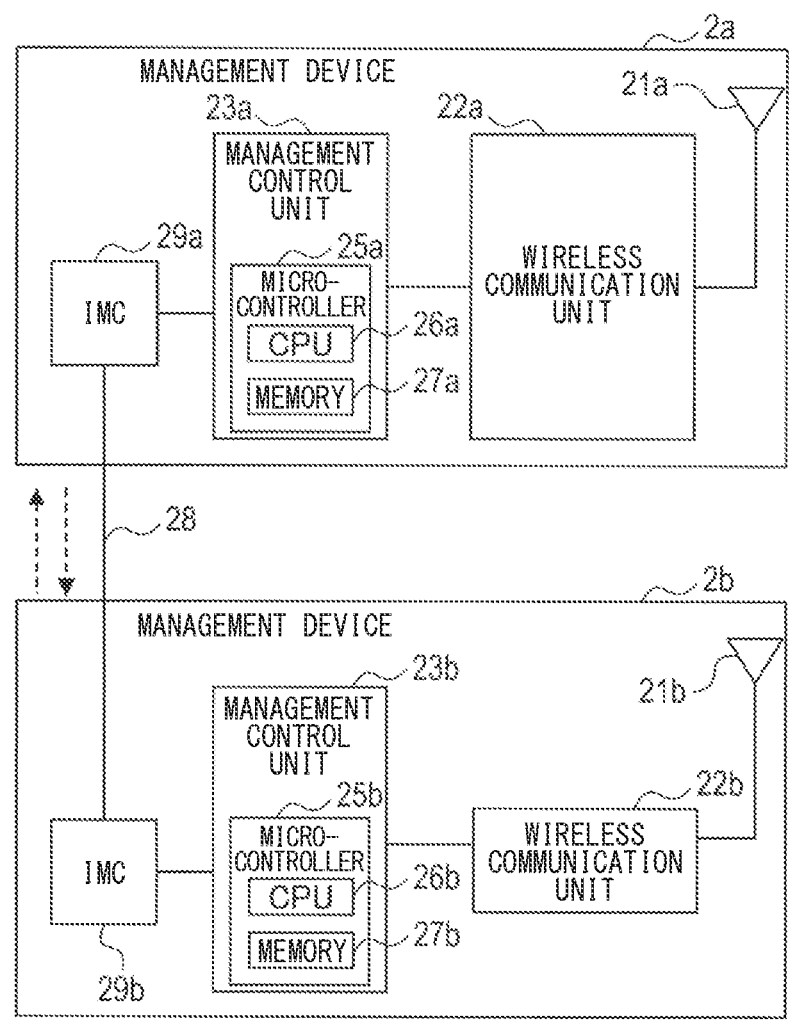
FIG. 11 is a block diagram of a configuration of the management device including an inter-management communication device that performs wired communication.

For example, as illustrated in FIG. 11, the inter-management communication unit 29a (IMC) included in the management device 2a and the inter-management communication unit 29b included in the management device 2b may be directly connected to each other via a communication line 28 so that they can communicate with each other. Alternatively, although not shown, the inter-management communication unit 29a included in the management device 2a and the inter-management communication unit 29b included in the management device 2b may be communicably connected to a common communication line in the vehicle V1.

Figure 8:
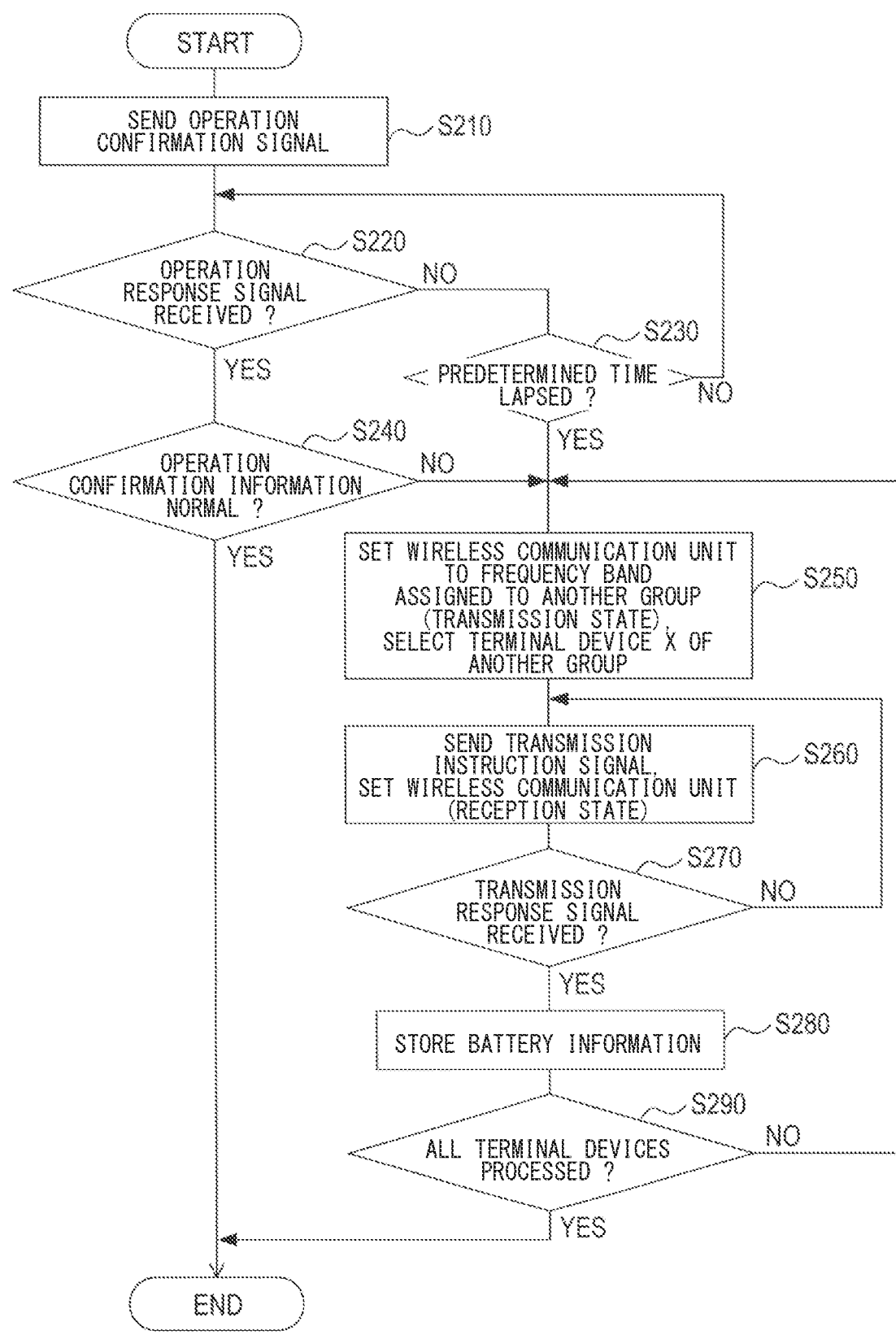
FIG. 8 is a flowchart of a monitoring process performed by the management control unit.

In such case, in S210 shown of FIG. 8, an operation confirmation signal is transmitted by wired communication using the inter-management communication unit 29, and in S220, an operation response signal is received by wired communication using the inter-management communication unit 29.

<Modification 2>

In the above-described embodiment, the wireless communication unit 42 has the same configuration as the wireless communication unit 22. In modification 2, for example, the wireless communication unit 42 may be provided with a circuit board that connects/wires each of the terminals of the switch 225 to use either the first frequency band or the second frequency band (not shown), instead of having the switch 225. In such case, in the above-described embodiment, the switch instruction to the switch 225 by the switching unit 74 is omitted.

<Modification 3>

In Modification 3, although not shown, for example, the wireless communication unit 42a may include only the first transmission/reception unit 221 and the antenna 21. Further, although not shown, the wireless communication unit 42b may include only the second transmission/reception unit 222 and the antenna 21, for example. Also in such case, in the above-described embodiment, the switch instruction to the switch 225 by the switching unit 74 is omitted.

[5. Other Embodiments]

The embodiments of the present disclosure have been described above, but the present disclosure is not limited to the above-described embodiments, and various modifications can be implemented.

(5a) In the above-described embodiments, the wireless communication unit 22 includes the switch 225, the transmission/reception switching unit 401 included in the first transmission/reception unit 221, and the transmission/reception switching unit 401 included in the second transmission/reception unit 222, in order to switch the above-described four communication states. However, the present disclosure is not limited to such configuration. The wireless communication unit 22 is not limited to use a switch and may use various other configurations in order to switch the above-described four communication states.

(5b) In the above-described embodiments, both of the management device 2a and the management device 2b include an abnormality determination unit, but the present disclosure is not limited to the above. Either the management device 2a or the management device 2b may include an abnormality determination unit. As a result, even if an abnormality occurs in the management device that does not include the abnormality determination unit, wireless communication can be continued between the management device that includes an abnormality determination unit and the terminal devices 4_1 to 4_8. As a result, the acquisition of the battery information can be continuable.

(5c) In the above-described embodiment, all of the terminal devices 4_1 to 4_8 include the wireless communication unit 42 including the non-specific communication device and the specific communication device, but the present disclosure is not limited to the above. For example, at least one of the plural terminal devices 4 included in the battery system 100 may include a non-specific communication device and a specific communication device. Further, the battery system 100 may be configured such that the terminal device 4 uses both of the non-specific communication device and the specific communication device.

(5d) In the above-described embodiment, the battery system 100 is mounted on the vehicle V1, but the present disclosure is not limited to the above. For example, the battery system 100 may be mounted in various devices other than the vehicle V1, or may be used by being connected to various devices.

(5e) The management control unit 23, the terminal control unit 43, and the method thereof according to the present disclosure may be implemented as a dedicated computer having a processor and a memory programmed to perform one or plural functions embodied by a computer program. Alternatively, the management control unit 23, the terminal control unit 43, and the method thereof described in the present disclosure may be implemented by a dedicated computer provided by having a processor with one or more dedicated hardware logic circuits. Alternatively, the management control unit 23, the terminal control unit 43, and the method thereof described in the present disclosure may be implemented by one or more dedicated computers each having a combination of (i) a processor and a memory programmed to perform one or plural functions and (ii) a dedicated computer provided by having a processor with one or more dedicated hardware logic circuits. Further, the computer program may be stored in a computer-readable, non-transitory tangible storage medium as instructions to be performed by a computer. The method for realizing the functions of the respective units included in the management control unit 23 and the terminal control unit 43 does not necessarily include software, and all the functions may be realized by using one or more hardware.

(5f) Plural functions of one element in the above-described embodiments may also be realized by plural elements, or one function of one element may be realized by plural elements. In addition, multiple functions of multiple elements may be realized by one element, or a single function realized by multiple element may be realized by one element. Moreover, a part of configuration/structure of the above-described embodiments may be omitted. Further, at least a part of the configuration of the above-described embodiments may be added to or replaced with the configuration of the above-described, other embodiments.

(5g) In addition to the above-described management control unit 23, the terminal control unit 43, CPU 26, CPU 46, the management device 2, the terminal device 4, the battery module 3, and the battery system 100, it may also be possible to implement/realize the present disclosure in various forms such as (i) a program functioning as the management control unit 23 and/or the terminal control unit 43, (ii) a non-transitory, substantial recording medium such as a semiconductor memory recording such a program, (iii) a communication method and the like. A communication system corresponds to a battery system, but does not necessarily include batteries.

In the above-described embodiments, the wireless communication unit 22 corresponds to a multi-band communication device (in claims), the inter-management communication unit 29 corresponds to an inter-management communication device (in claims), and the wireless communication unit 42 corresponds to a specific communication device and a non-specific communication device (in claims). The battery management unit 61 corresponds to a regular management communication unit (in claims), and the monitor unit 62 corresponds to an abnormality determination unit (in claims), an abnormal time communication unit (in claims), and a switch instruction unit (in claims). The information transmitter unit 72 corresponds to a regular terminal communication unit (in claims). S220-S240 correspond to the process as the abnormality determination unit, S250-S290 correspond to the process as the abnormal time communication unit, and S250 and S260 correspond to the process as the switch instruction unit.

What is claimed is:

1. A communication system comprising:
   plural management control units each managing a state of a battery; and
   plural terminal devices each acquiring battery information about at least one battery and communicating the acquired battery information with at least one of the plural management control units, wherein
   at least one of the plural management control units includes an abnormality determination unit that is configured to determine whether an abnormality has occurred in an other of the plural management control units based on communication with the other of the plural management control units via an inter-management communication device for performing communication with the other of the plural management control units.

2. The communication system according to claim 1, wherein
   the at least one of the plural management control units transmits an operation confirmation signal to the other of the plural management control units,
   the other of the plural management control units transmits an operation response signal back to the at least one of the plural management control units in response to receiving the operation confirmation signal, and
   the at least one of the plural management control units determines whether an abnormality has occurred in the other of the plural management control units based on the operation response signal.

3. The communication system according to claim 1, wherein
   the at least one of the plural management control units switches a frequency band used for communication with a terminal device of the plural terminal devices upon determining that an abnormality has occurred in the other of the plural management control units.

4. The communication system according to claim 1, wherein
   the at least one of the plural management control units performs wireless communication with a terminal device of the plural terminal devices using a pre-assigned frequency band at a predetermined battery management cycle to manage the state of the battery.

5. The communication system according to claim 1, wherein
   the at least one of the plural management control units, upon determining that an abnormality has occurred in the other of the plural management control units, transmits a transmission instruction signal to a terminal device of the plural terminal devices from which the other of the plural management control units has acquired the battery information, the transmission instruction signal causing the terminal device to transmit the battery information, and
   the terminal device transmits the battery information to the at least one of the plural management control units based on the transmission instruction signal.

6. The communication system according to claim 5, wherein
   the transmission instruction signal includes identification information of the terminal device.

7. The communication system according to claim 1, wherein
   upon determining that an abnormality has occurred in the other of the plural management control units, the at least one of the plural management control units manages the battery information in a terminal device of the plural terminal devices from which the other of the plural management control units has acquired the battery information, and
   upon determining that no abnormality has occurred in the other of the plural management control units, the at least one of the plural management control units does not manage the battery information in the terminal device from which the other of the plural management control units has acquired the battery information.

8. The communication system according to claim 1, wherein
   the at least one of the plural management control units performs communication with a terminal device of the plural terminal devices using a predetermined first frequency band, and
   the other of the plural management control units performs communication with the terminal device using a predetermined second frequency band that does not overlap with the first frequency band.

9. The communication system according to claim 1, wherein the at least one of the plural management control units including the abnormality determination unit further includes:
an abnormal-time communication unit configured to perform communication with a terminal device of the plural terminal devices from which the other of the plural management control units has acquired the battery information using a multi-band communication device upon determining that an abnormality has occurred in the other of the plural management control units, wherein
the multi-band communication device is a communication device different from the inter-management communication device and is configured to perform communication using plural frequency bands.

10. The communication system according to claim 1, wherein
each terminal device of the plural terminal devices is configured to:
acquire, as the battery information, a voltage of the at least one battery at a predetermined information acquisition cycle; and
transmit the battery information to at least one of the plural management control units at a predetermined terminal management cycle, and
the information acquisition cycle is a cycle shorter than the terminal management cycle.

11. The communication system according to claim 1, wherein
each terminal device of the plural terminal devices is configured to:
acquire, as the battery information, a voltage of the at least one battery at a predetermined information acquisition cycle; and
transmit the battery information to at least one of the plural management control units at a predetermined terminal management cycle.

12. The communication system according to claim 1, wherein
the inter-management communication device is one of plural inter-management communication devices, and
the communication system further comprises:
plural management devices, wherein each of the plural management devices comprises:
at least one management control unit of the plural management control units; and
at least one inter-management communication device of the plural inter-management communication devices.

13. The communication system according to claim 1, wherein
each of the plural management control units is configured to communicate with each of the plural terminal devices.

14. A communication system comprising:
plural management control units each having a first processor programmed to manage a state of a battery; and
plural terminal devices each having a second processor programmed to acquire battery information about at least one battery and communicate the acquired battery information with at least one of the plural management control units, wherein
at least one of the first processors of the plural management control units is further programmed to determine whether an abnormality has occurred in an other of the plural management control units based on communication with the other of the plural management control units via an inter-management communication device that is configured to perform communication with the other of the plural management control units.

* * * * *